Feb. 26, 1924.
J. P. WRIGHT ET AL
1,485,004
MACHINE FOR MAKING BOXES
Filed Dec. 15, 1922     14 Sheets-Sheet 5
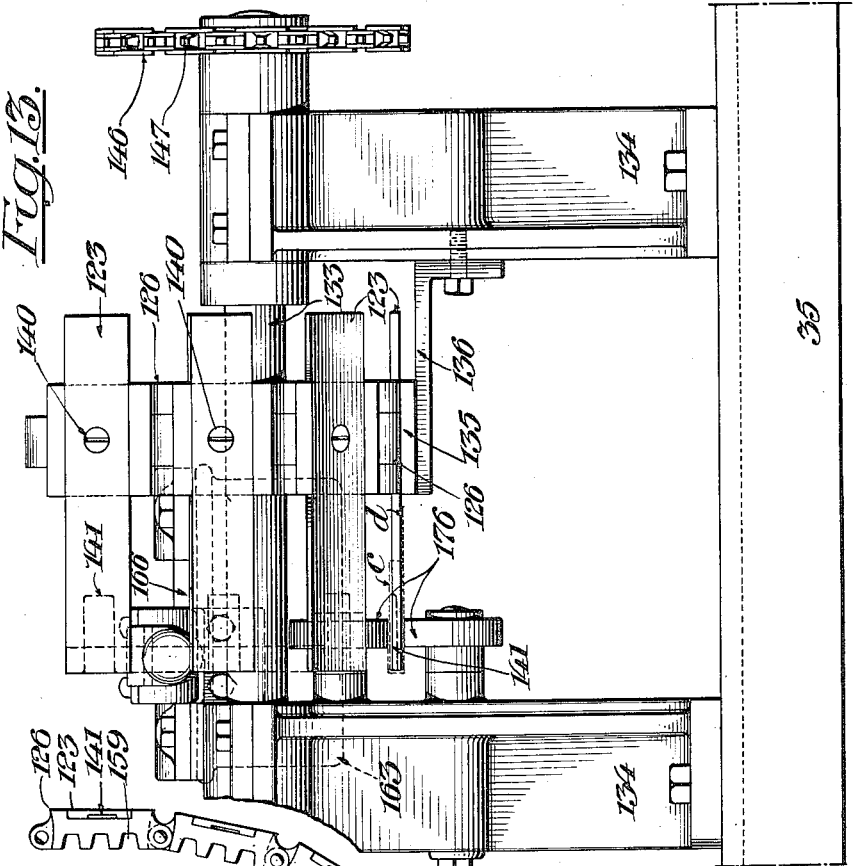

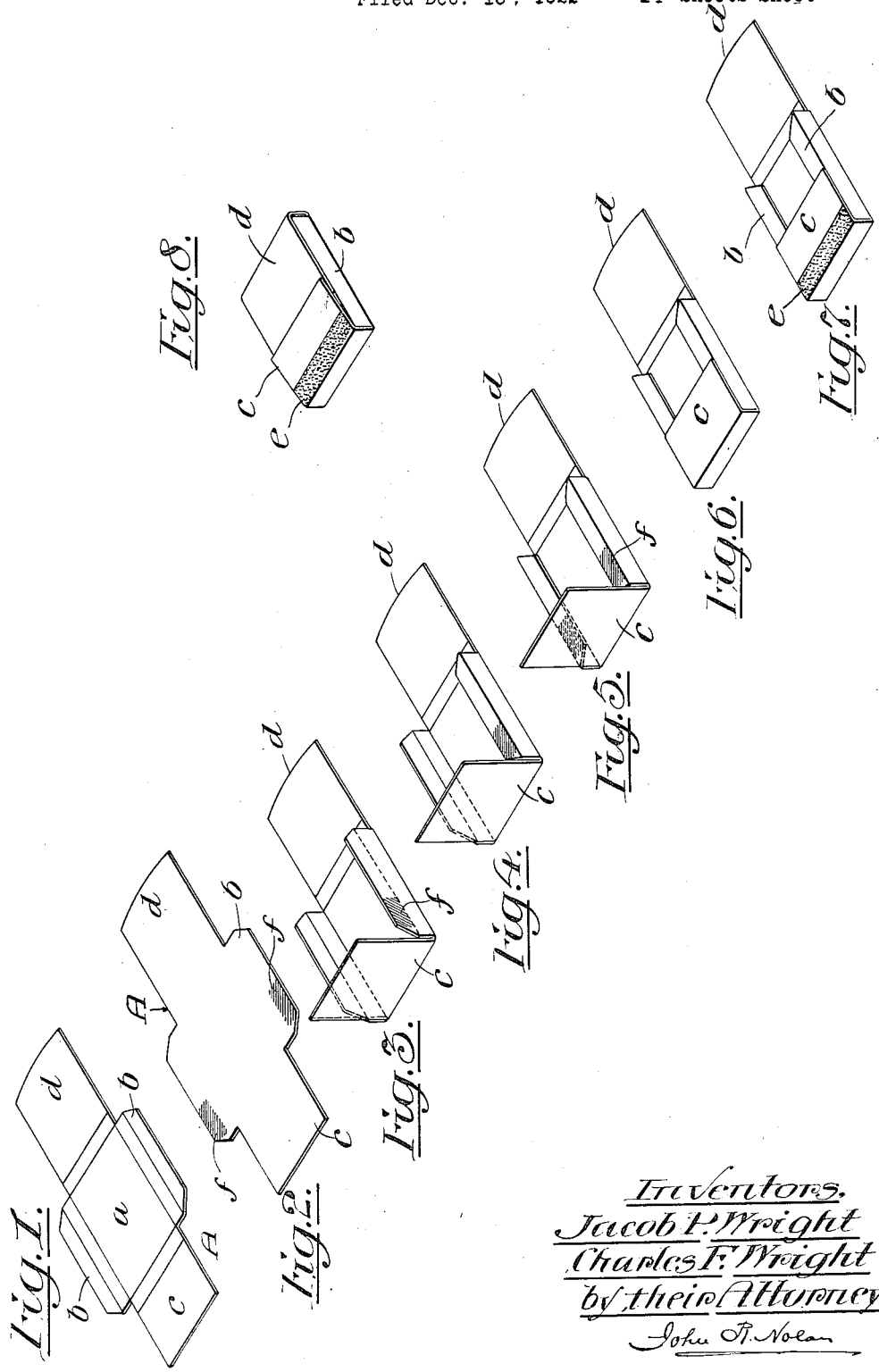

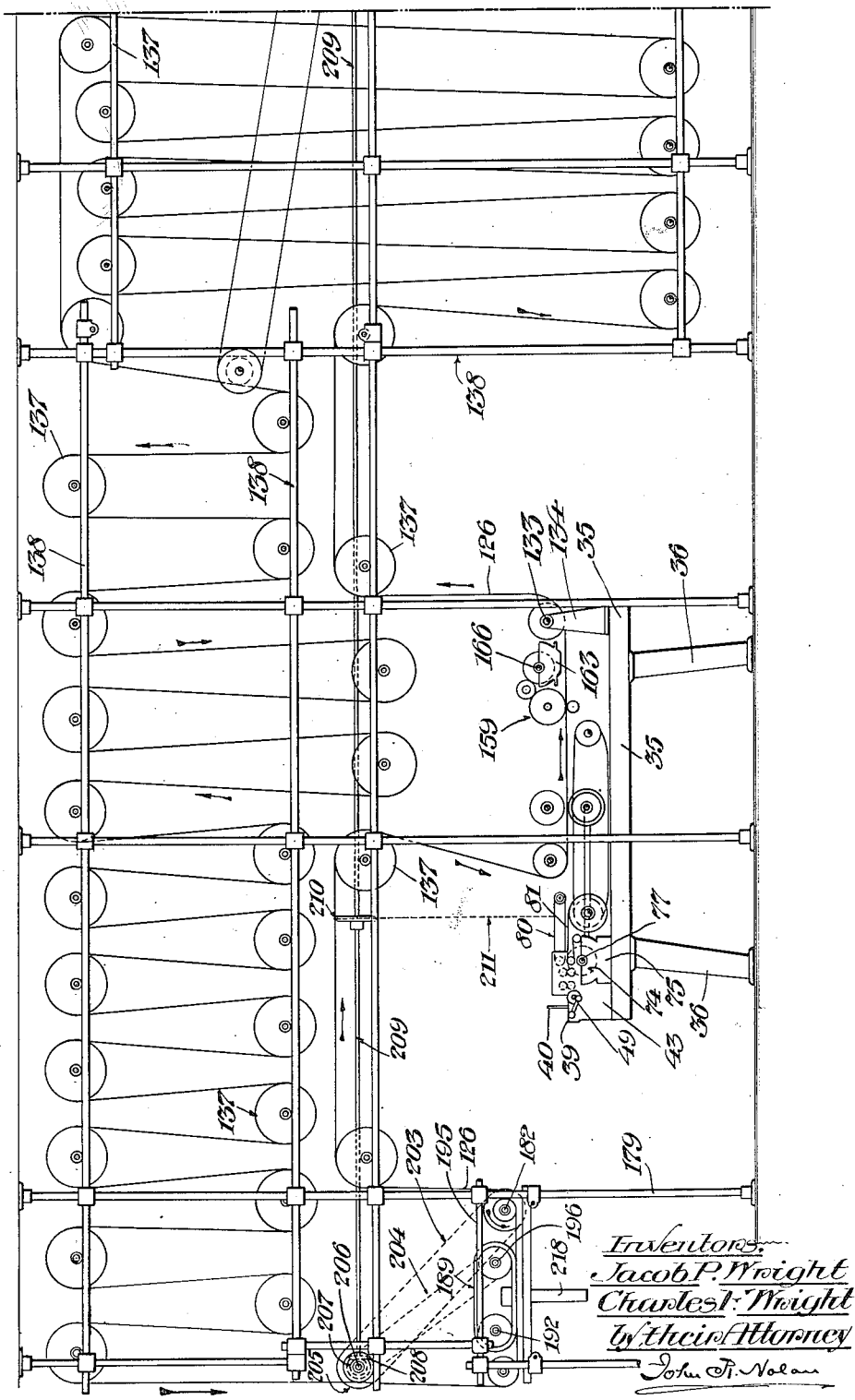

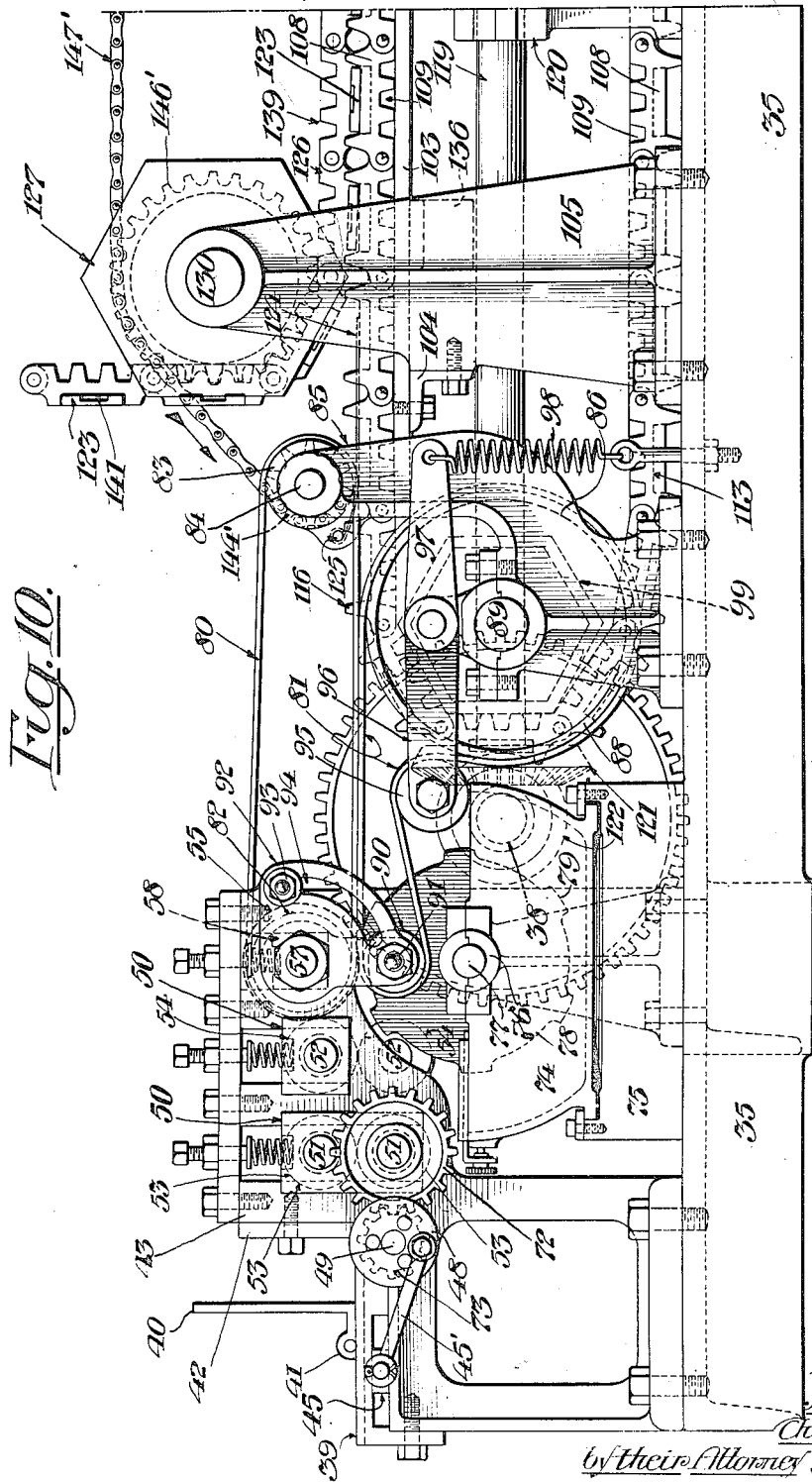

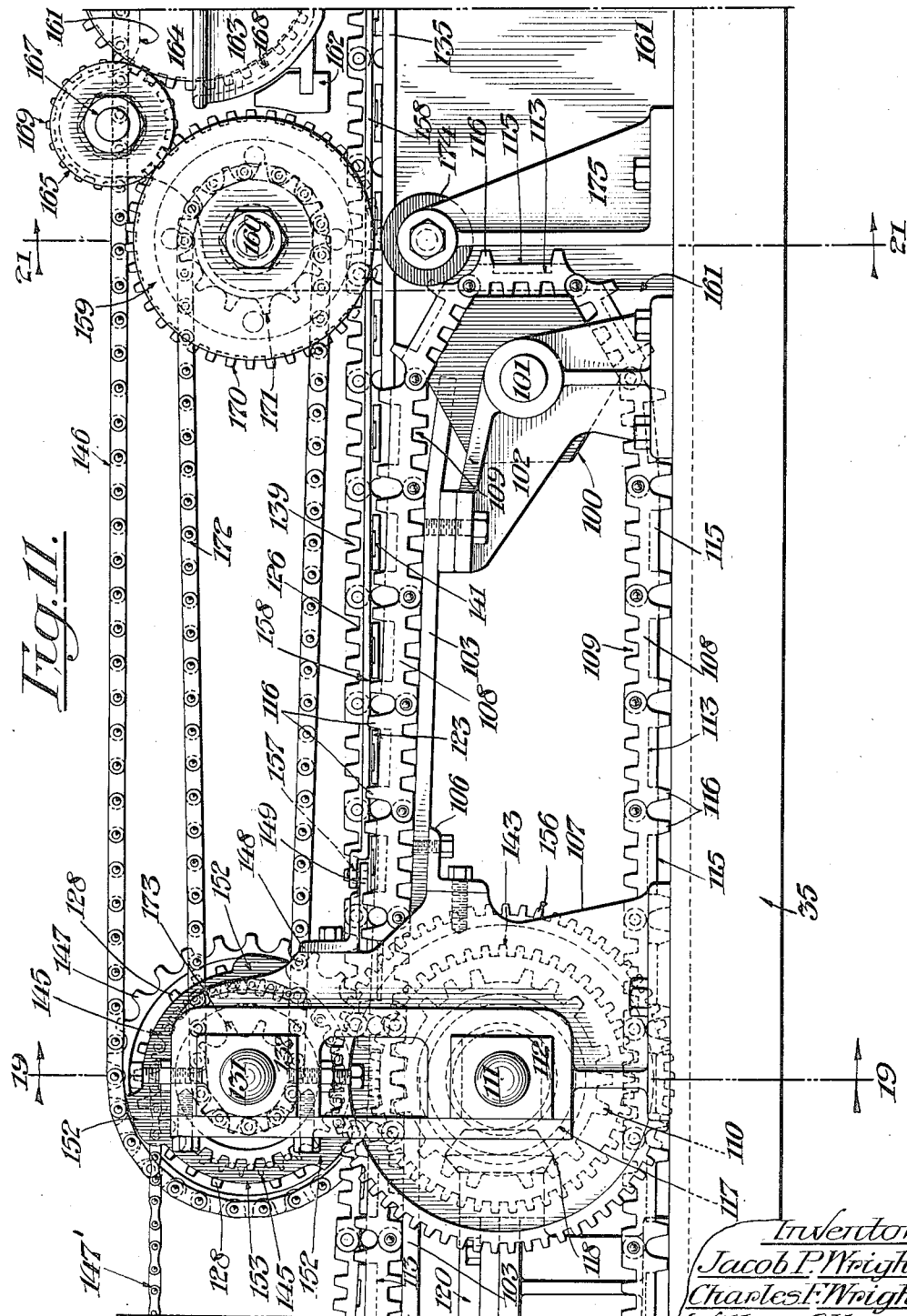

Feb. 26, 1924.  
J. P. WRIGHT ET AL  
MACHINE FOR MAKING BOXES  
Filed Dec. 15, 1922  14 Sheets-Sheet 6
1,485,004
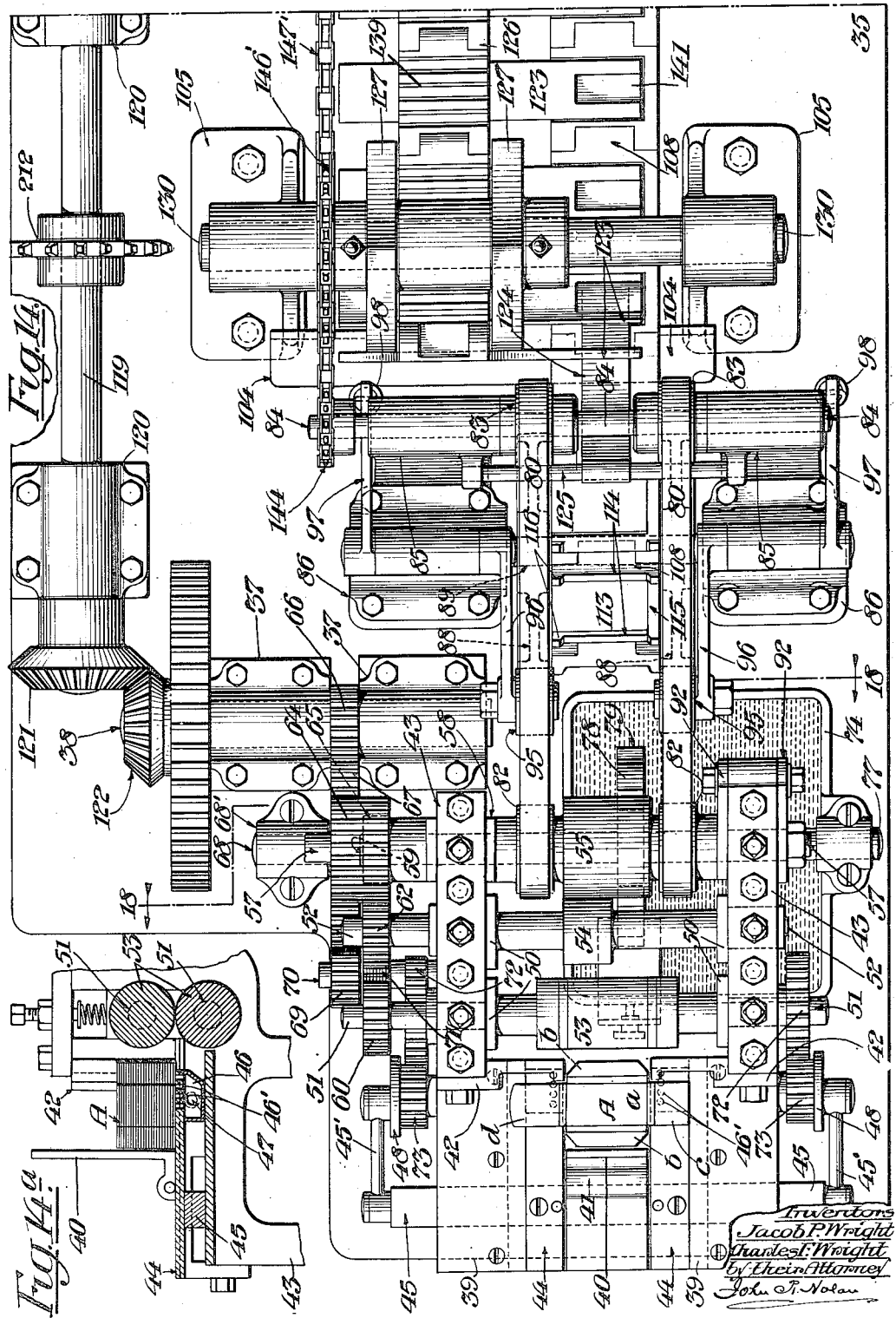

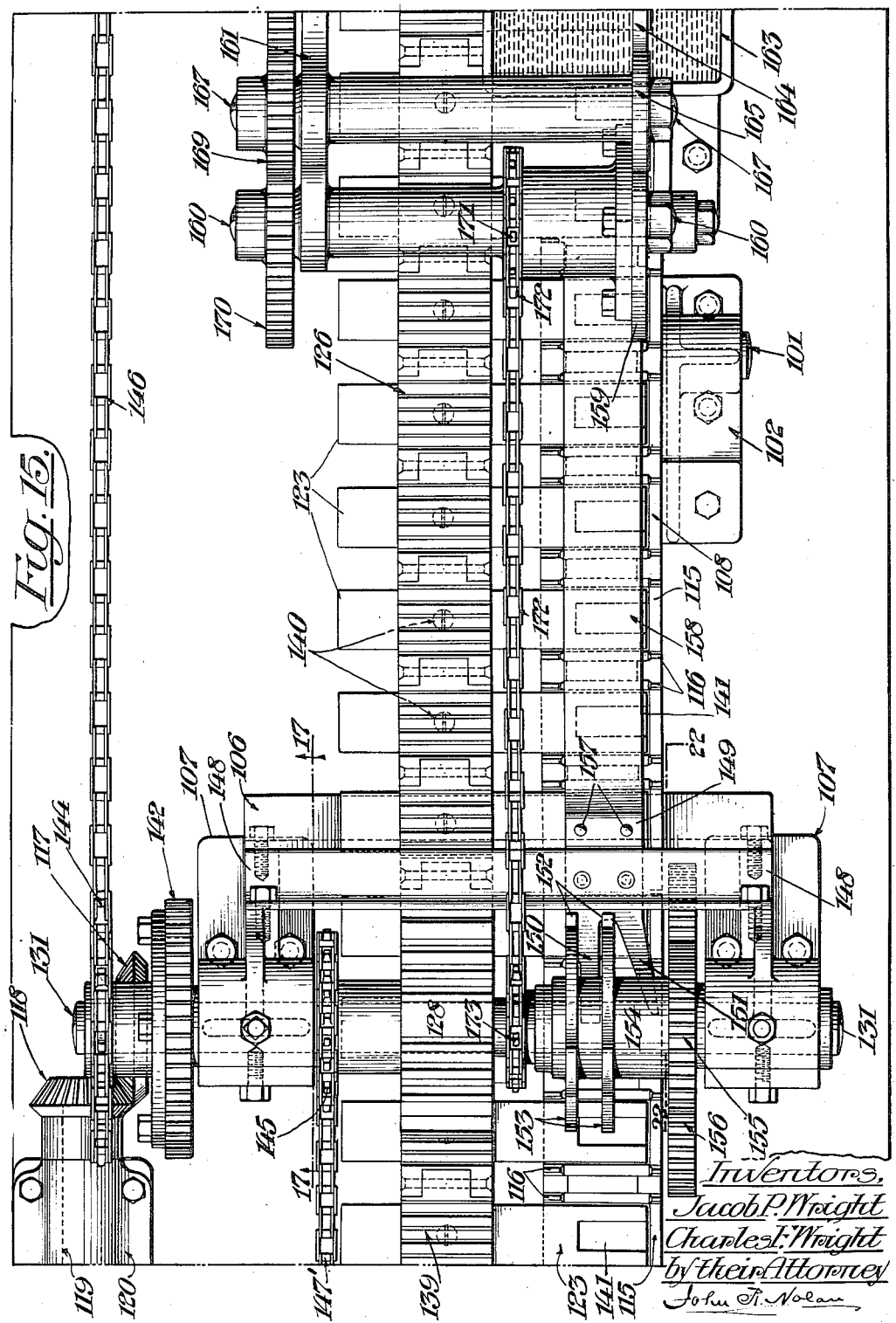

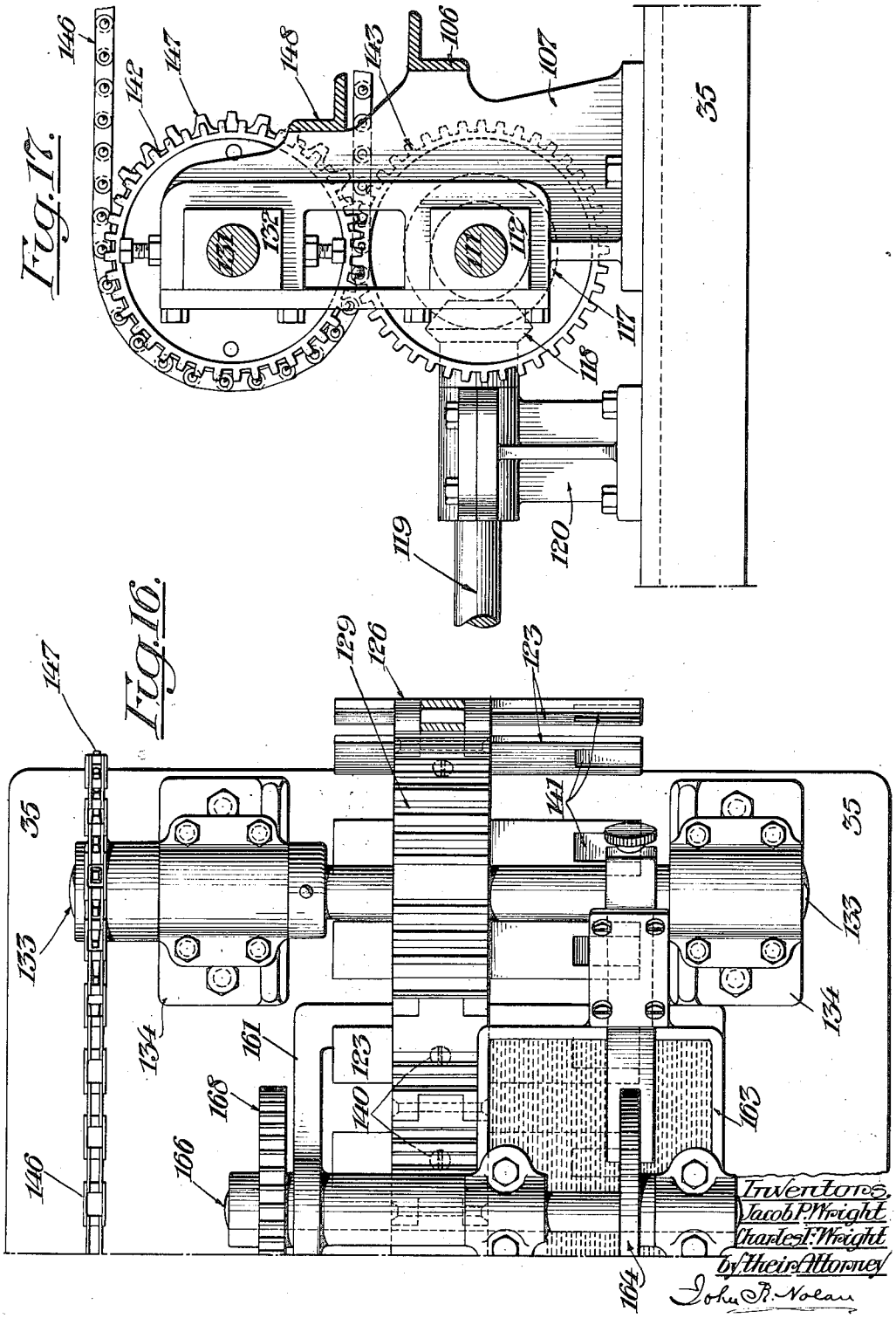

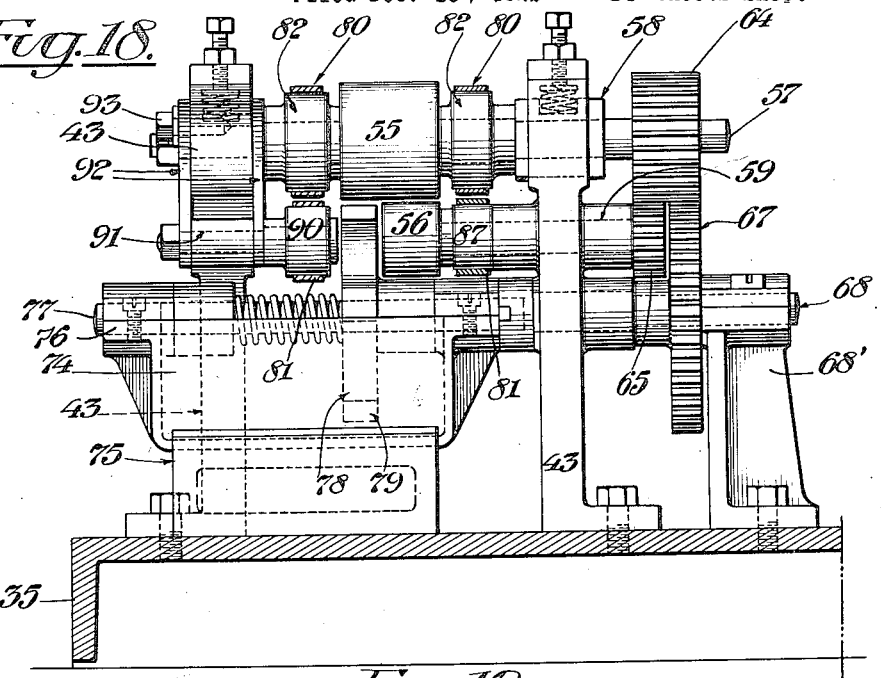
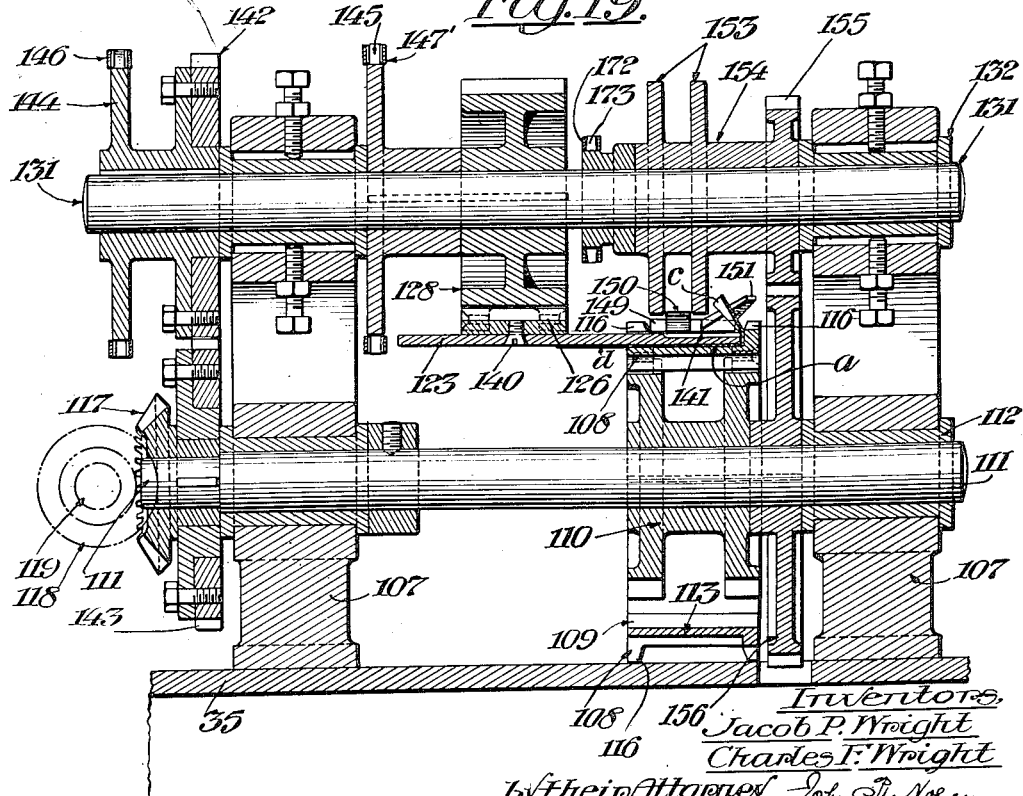

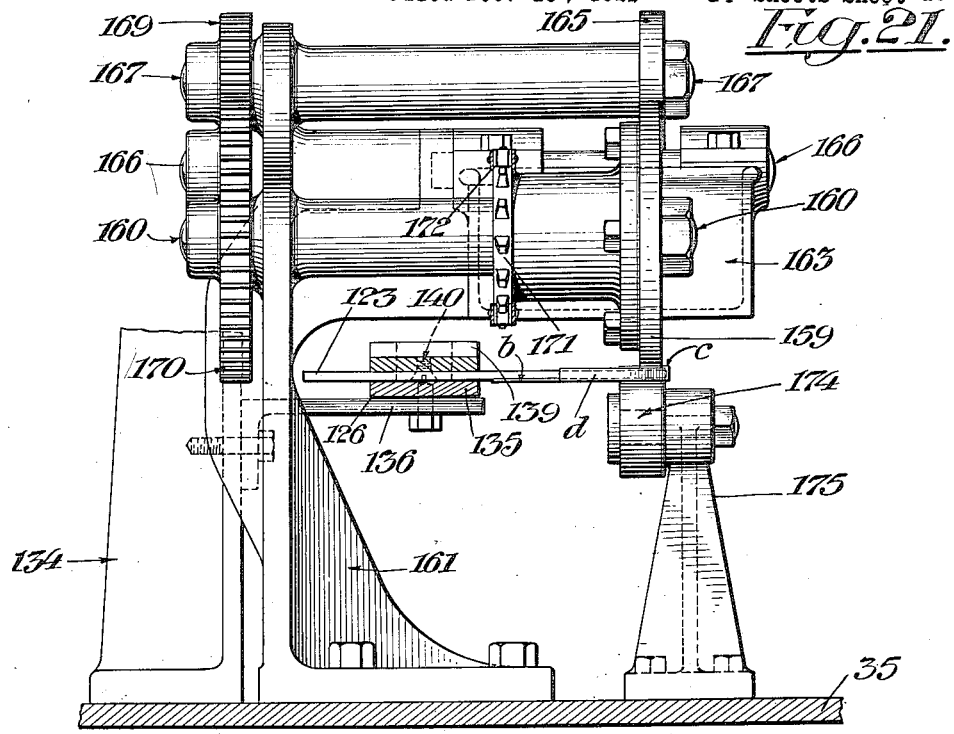
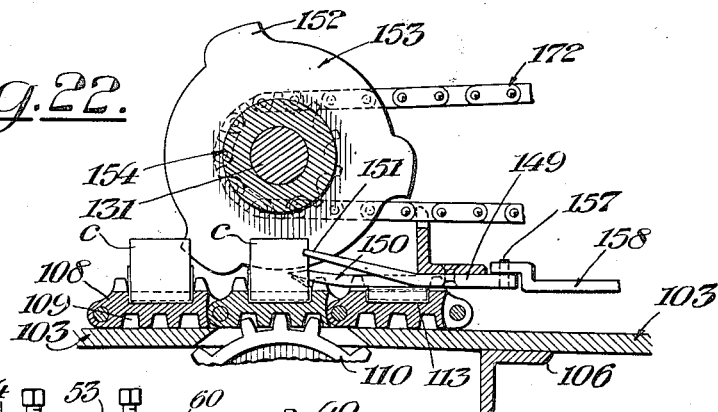
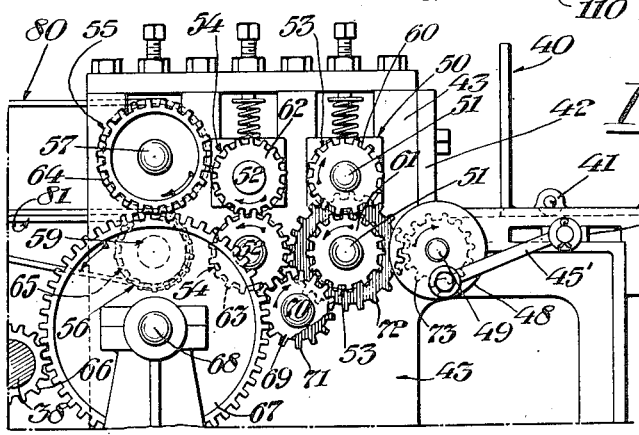

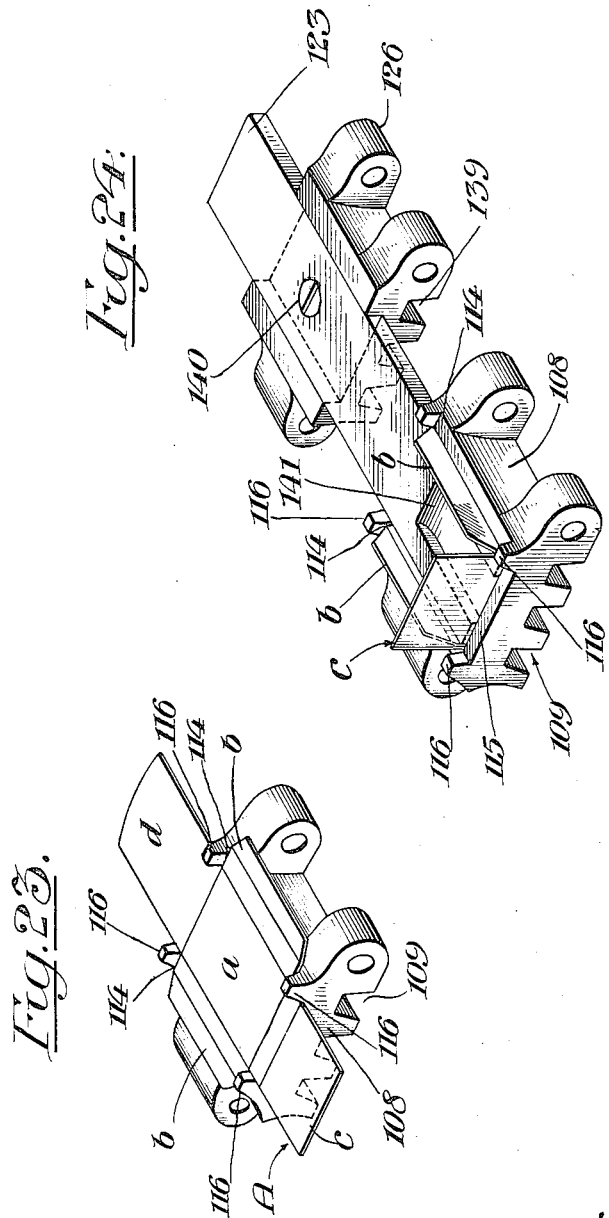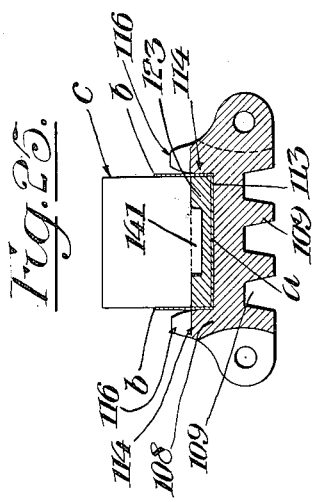

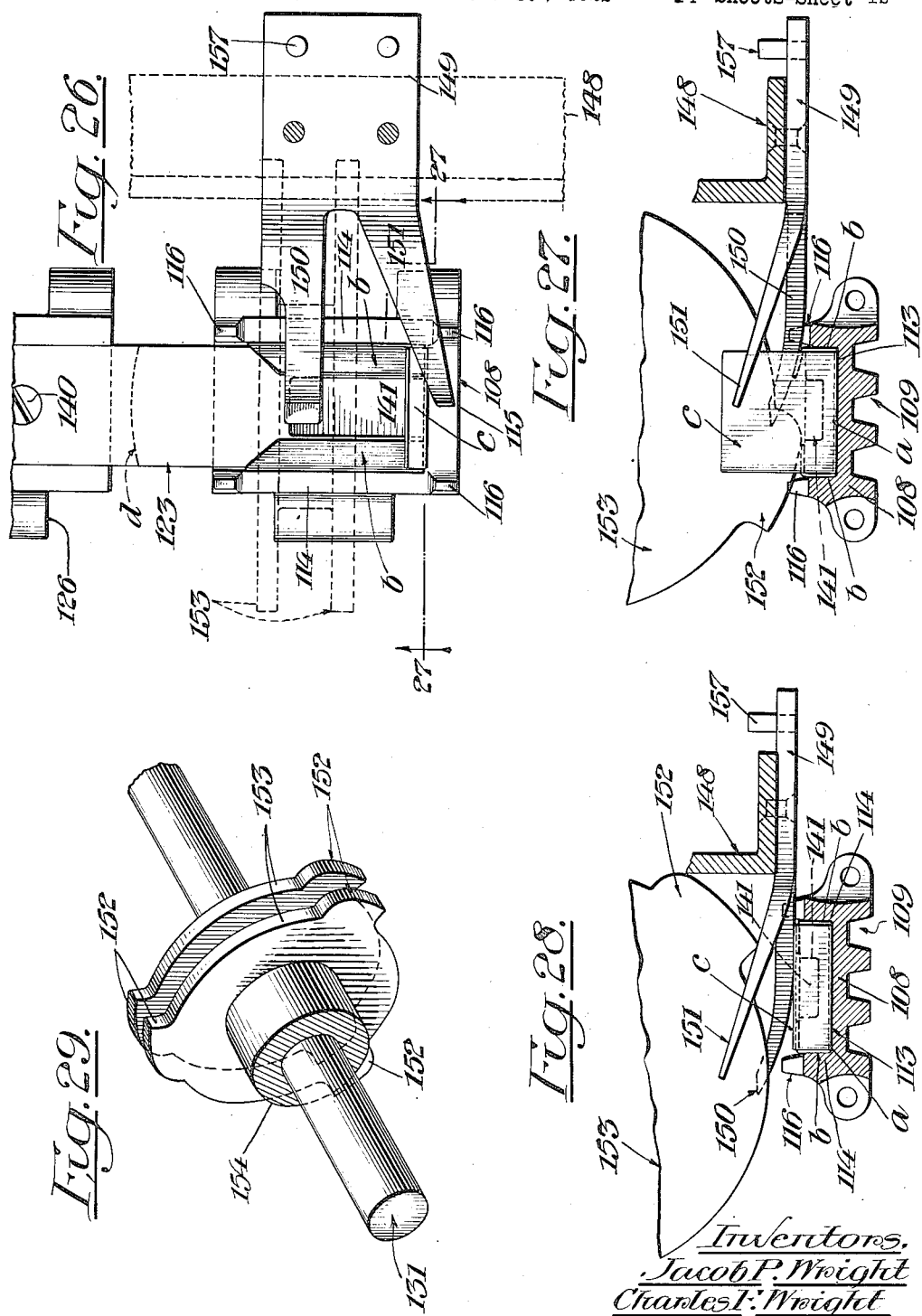

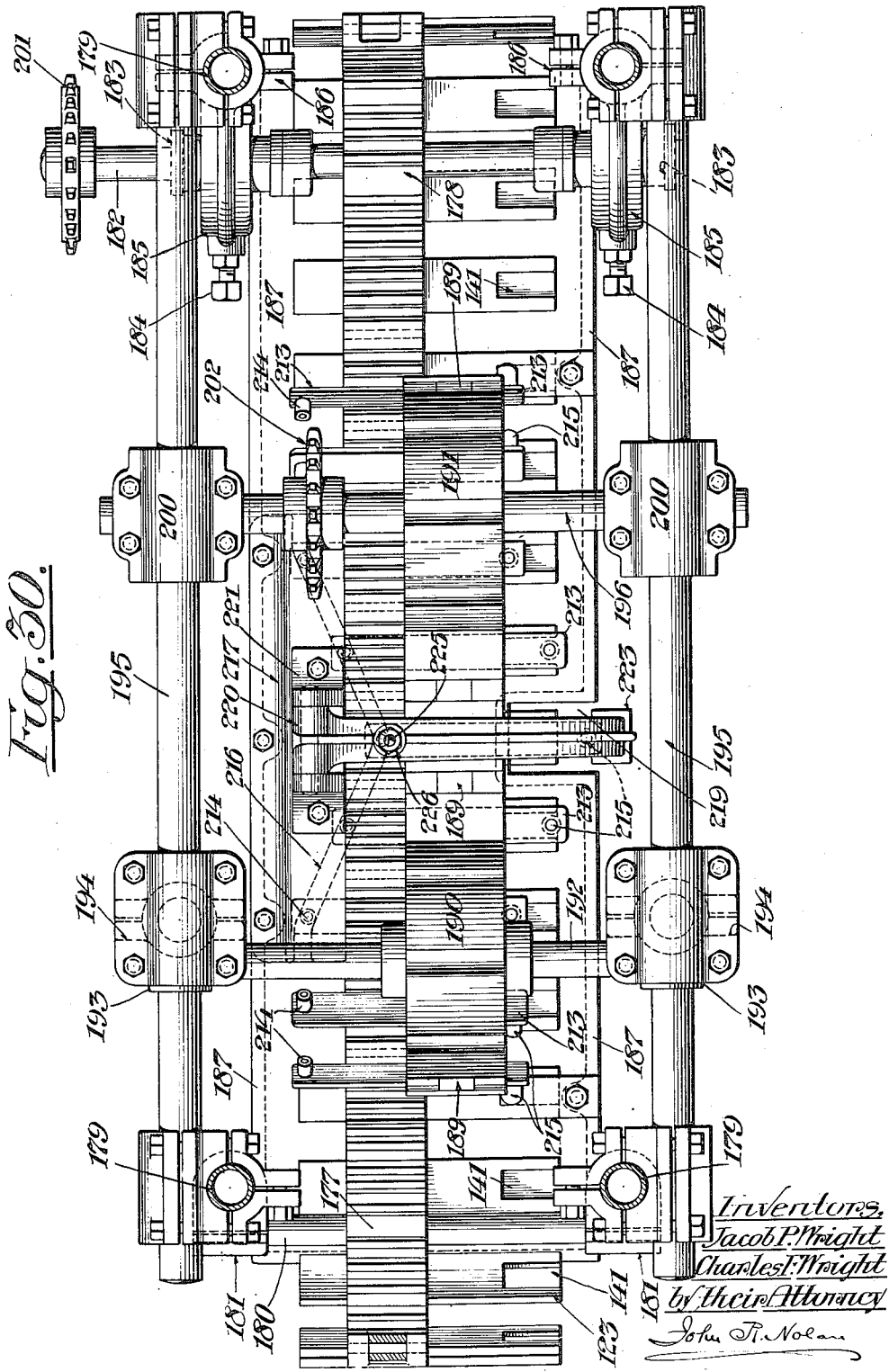

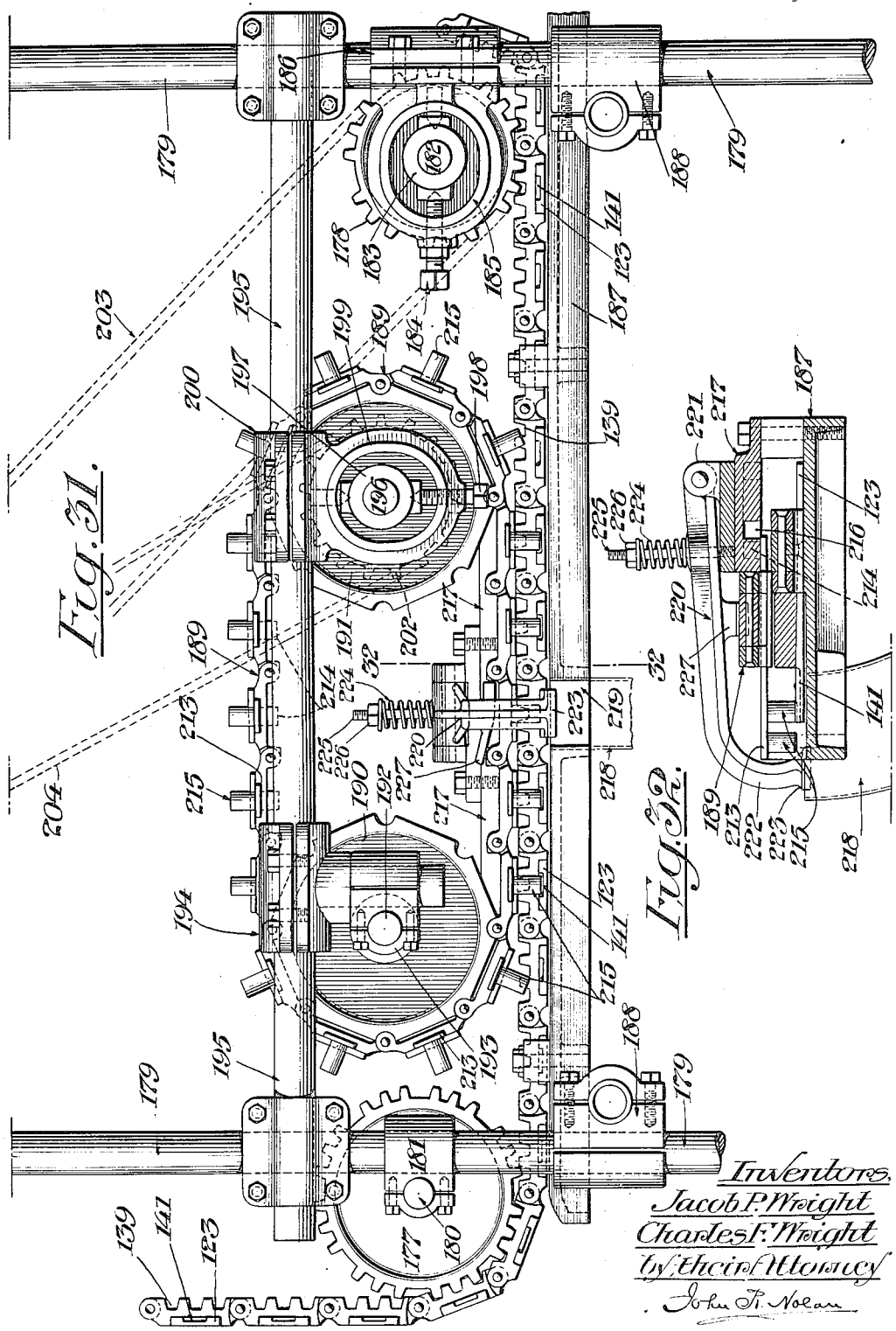

Patented Feb. 26, 1924.

1,485,004

UNITED STATES PATENT OFFICE.

JACOB P. WRIGHT, OF BARBERTON, AND CHARLES F. WRIGHT, OF AKRON, OHIO, ASSIGNORS TO THE DIAMOND MATCH COMPANY, OF CHICAGO, ILLINOIS, A CORPORATION OF ILLINOIS.

MACHINE FOR MAKING BOXES.

Application filed December 15, 1922. Serial No. 607,061.

*To all whom it may concern:*

Be it known that we, JACOB P. WRIGHT and CHARLES F. WRIGHT, both citizens of the United States, and residents respectively, of Barberton and Akron, both in the county of Summit and State of Ohio, have invented certain new and useful Improvements in Machines for Making Boxes, of which the following is a specification.

This invention relates to machines for making boxes or cases for the reception of matches and other articles, having reference more especially to a machine for the production of a pocket-size box or case composed of a rectangular body having an integral cover flap.

The object of our invention is the provision of a machine whereby boxes or cases of the character mentioned are rapidly and economically produced, and whereby also a coat of match ignition material is efficiently applied to the body of the box or case during the manufacture thereof.

The machine herein illustrated, as an embodiment of our invention, comprises mechanism for feeding suitable blanks in rapid succession from a stack; mechanism for applying glue or the like to the blanks; mechanism whereby such blanks are folded and formed into boxes; mechanism whereby friction or ignition paint is applied to the boxes; mechanism whereby the boxes are transported through an extended drying path, and, finally, mechanism whereby the completed boxes are ejected from the machine; the various mechanisms being constructed and cooperatively arranged to produce uniform boxes or cases in rapid continuous succession.

The invention also comprises various features of construction and combinations of parts, all of which will be hereinafter described and claimed.

In the drawings—

Figure 1 is a perspective view of a box blank showing the scored surface thereof.

Fig. 2 is a similar view showing the other surface of the blank with the side laps supplied with glue preparatory to the box folding operations.

Figs. 3 to 6, inclusive, illustrate the blank in succeeding folding stages.

Fig. 7 is a view of the completed box as provided with friction or ignition coating on the folded end lap.

Fig. 8 shows the box with its end flap folded over upon the body of the box and tucked under the end lap, as in use.

Fig. 9 is a diagrammatic side elevation of a box making machine embodying the principle of our invention.

Figs. 10, 11 and 12 are succeeding views of one side of the blank feeding, gluing, folding and paint applying mechanisms of the machine.

Fig. 13 is an elevation of the mechanism shown in Fig. 12.

Figs. 14, 15 and 16 are plan views of the mechanisms shown in Figs. 10, 11 and 12, respectively.

Fig. 14$^a$ is a detail section of the blank hopper and adjuncts, the chambered slide being shown in retracted position.

Fig. 17 is a longitudinal vertical section, as on the line 17—17 of Fig. 15, showing the drive mechanism for the rotary folder, and adjuncts.

Fig. 18 is a transverse vertical section of the machine, adjacent the glue-applying mechanism thereof, as on the line 18—18 of Fig. 14.

Fig. 19 is a similar section of the machine, through the die and former conveyors, and their driving mechanism, as on the line 19—19 of Fig. 11.

Fig. 20 is an elevation of the gear train for the blank-ejecting slide, the feed-rolls and the glue-applying wheel, as seen from the opposite side of Fig. 10.

Fig. 21 is a transverse section of the machine adjacent the paint-applying mechanism, as on the line 21—21 of Fig. 11.

Fig. 22 is a longitudinal vertical section, one the line 22—22 of Fig. 15, showing the folding devices and their relation to the die conveyer, the partially folded blanks being indicated in adjacent links of the conveyer.

Fig. 23 is a perspective view of one of the links of the die conveyer, showing the blank as positioned thereon preparatory to the engagement of a former bar with the blank.

Fig. 24 is a similar view of the said die-conveyer link and an adjacent link of the former conveyer, a former bar of the latter being engaged with, and the blank being positioned in the die conveyer link.

Fig. 25 is a transverse section of the die conveyer link, blank and former bar shown in Fig. 24.

Fig. 26 is a detail, in plan, of adjacent links of the die and former conveyers, showing a former bar engaged with the die conveyer link and its contained blank, and also showing the stationary and rotary folders, the latter being indicated in dotted lines.

Fig. 27 is a vertical section through the die conveyer link, as on the line 27—27 of Fig. 26, showing the progressive actions of the folders upon the opposing laps of the blank.

Fig. 28 is a similar view, showing the link advanced in relation to the folders, and the side and end laps as completed folded.

Fig. 29 is a sectional perspective view of the rotary folder and a portion of the shaft on which it is loosely mounted.

Fig. 30 is a plan of the mechanism for removing the finished boxes from the bars of the former conveyer.

Fig. 31 is a side elevation of the mechanism shown in Fig. 29.

Fig. 32 is a transverse vertical section through the box ejecting devices, as on the line 32—32 of Fig. 31.

Referring to the drawings, A, Fig. 1, designates a blank of suitable paper stock comprising a main or body portion, $a$, side extensions constituting laps $b$, and end extensions constituting a lap $c$ at one end and a flap $d$ at the opposite end of the body portion, said blank being appropriately scored to afford fold lines for the respective extensions and being of suitable size and contour to provide, when folded, a box or case of the general form shown in Figs. 6 and 7. Such box, when designed to contain matches, is provided on one side, preferably its lower front portion, with a coat of suitable friction or ignition material $e$. When the box is supplied with matches or the like the flap $d$ is folded over and upon the open front portion of the body of the box and the free end of the flap is tucked under the upper portion of the end lap $c$, as seen in Fig. 8.

The machine, in the preferred form illustrated, includes a bed or table 35 supported by suitable legs 36. On the bed adjacent its forward end are standards 37 provided with bearings for a transverse shaft 38, which is geared with and driven from a suitable motor (not shown). On the forward end of the bed is a frame structure including a platform 39 forming the bottom of a hopper for the reception of a pile of the blanks A. This hopper, in the present instance, comprises upstanding front and rearward walls, the former consisting of a plate 40 which is hinged at its lower end to the platform, as at 41, so that it may be swung forward, if desired, and the latter wall consisting of two plates 42 bolted to the side members 43 of the frame structure. The plates 42 are spaced apart medially of the hopper to receive between them the adjacent side laps $b$ of the blanks when the blanks are contained in the hopper with the opposite side laps in contact with the forward wall 40. (See Figs. 14, 14$^a$). The lower ends of the plates 42 are spaced above the bottom of the hopper a sufficient distance to permit each succeeding lowermost blank to be pushed flatwise through the space and thus be removed from the remaining blanks of the pile by means, for example, of a reciprocative ejecting slide. In this instance an air exhaust or "suction slide" of ordinary construction is employed, the same comprising two spaced-apart slide members 44 fitted to guide ways in the top of the platform and secured at their outer ends to a crosshead 45 mounted in parallel guides in the sides of the platform. The inner or acting portions of the slide members are chambered, as at 46, and provided on their upper sides with suitably-disposed apertures 46' upon which rest the end extensions of the lowermost blank contained in the hopper. An air-exhaust connection 47 extends form the chamber of each of the slide members, and hence the end extensions of the blank are maintained flatwise upon the apertured portions of said members. The respective ends of the cross-head are connected by rods 45' to crank disks 48 on stud shafts 49 at the respective sides of the frame structure, which shafts are geared with and operated from the driving shaft 38 in such a manner that the slide is longitudinally reciprocated to carry each succeeding lowermost blank from the pile contained in the hopper, as hereinafter described.

Mounted in suitable bearing blocks 50 in the side members 43 of the frame structure are the shafts 51, 52 of two pairs of feed rolls, 53, 54, respectively, which are positioned and concertedly operated to receive the successive blanks when they are carried from the hopper by the slide 44, and feed them rearward and into the bite of an adjacent pair of properly driven feed-rolls 55, 56. The roll 55 is formed on or secured to a shaft 57 having its bearings in boxes 58 on the frame members 43, and the roll 56 is formed on or secured to a short shaft 59 having its bearing in one of the frame members. The shafts of the various feed rolls are concertedly driven from the main shaft 38 by a train of gear wheels clearly shown in Figs. 10, 14, 18 and 20, as follows: At one side of the machine the shafts 51 of the rolls 53 are provided with meshing gear wheels 60, 61, respectively; the shafts 52 of the rolls 54 are provided with meshing gear wheels 62, 63, respectively, and the shafts 57, 59 of the rolls 55, 56 are provided with meshing gear wheels 64, 65, respectively. Fast on the main shaft is a gear wheel 66 in mesh with a large gear wheel 67 on a short shaft 68 forward of and parallel to the main shaft. The shaft 68 has its bearings in a standard 68' and in the adjacent side member of the frame structure, directly below the axis of the shaft 59. The gear wheel 67 is in mesh with the gear wheel 64 on the shaft 57, and is also in mesh with a gear wheel 69 on a forward stud shaft 70. The latter shaft is provided with a gear wheel 71 in mesh with the gear wheel 61 on the lower feed-roll shaft 51, and also with the gear wheel 63 on the lower feed-roll shaft 52. Hence proper motion is transmitted from the drive shaft to the respective shafts of the feed rolls.

The shaft 51 is provided adjacent its respective ends with gear wheels 72 in mesh with gear wheels 73 on the stud shafts 49 to which the crank disks 48 are affixed, and consequently motion is transmitted to the said disks in a manner to actuate the slide for the purpose previously mentioned. (See Figs. 10, 14, 18 and 20.)

A glue pot 74 is removably supported on a stand 75 located on the bed 35 directly beneath the feed-rolls 55, 56, one of the side members 43 of the frame structure being suitably shaped to afford space for the passage of the pot to and from the stand. Mounted in bearings 76 in the side walls of this pot is a shaft 77 which is detachably coupled to and constitutes, in effect, a continuation of the driven shaft 68 above referred to. On the shaft 77 is a glue transfer wheel 78 having spaced-apart peripheral pads 79 which turn in proximity to the feed roll 56 and successively contact with and apply glue (f, Fig. 2) to the side laps of the progressing blank. It is to be noted that the lower shaft 52 and the adjacent shaft 59 are relatively short in order to support their respective rolls 54, 56 laterally of the glue transfer wheel, and thus afford clearance for the latter; and that the roll 55 is sufficiently broad to overhang the transfer wheel 78 and thus serve as a back support for the blank during the application of the glue thereto. (See Figs. 10, 14 and 18.)

Coincidentally with the engagement of the body of the blank by the feed-rolls 55, 56 the end extensions of the blank are entered between and gripped by the contiguous horizontal runs of upper and lower pairs of travelling belts 80, 81, respectively. The upper belts 80 pass about pulleys 82 loose on the shaft 57 and also about similar pulleys 83 fast on a rearward transverse shaft 84 having its bearings in the upward extensions 85 of standards 86 on the bed. The shaft 84 is positively driven by suitable gearing in a manner to impel the lower runs of the belts 81 continuously toward the rear of the machine, as will be hereinafter described. One of the lower belts 81 passes about a pulley 87 loose on the feed-roll shaft 59 and also about one of two spaced apart pulleys 88 fast on a rear shaft 89 supported in the standards 86. The other lower belt 81 passes about the other pulley 88 and also about a pulley 90 loose on a short shaft 91 which is in axial alignment with but is spaced from the roll 56 so as to accommodate the transfer wheel 78. The shaft 91 is fixed to a depending two-part bracket 92 which is hung on the adjacent end of the shaft 57 and embraces the overhanging portion of the proximate frame member 43. The outer bracket part is connected to this overhanging portion by a bolt 93 passing through an arcuate slot 94 in such bracket part, and hence by loosening the bolt the bracket 92, together with the shaft 91 and its pulley 90, can be nicely adjusted through a vertical arc, so as to position the upper run of the adjacent belt 81 in close active relation to the lower run of the companion belt 80, and then by tightening the bolt the bracket and its appurtenances can be secured in adjusted position. Also, the pulley 90 and its bracket 92, together with the belt 82, can be swung upward above the plane of the glue wheel 78 in order to facilitate the removal of the latter. The lower runs of the two belts 81 pass about idler rolls 95 carried by the forward arms 96 of levers that are fulcrumed on the standards 86, the rear arms 97 of the levers being connected to the bed by springs 98 which tend to hold the idlers in yielding contact with the respective belts 81 and thus keep the latter under tension. (See Figs. 10, 14 and 18.)

The shaft 89, together with the pulleys 88, are positively driven, as presently described, so as to impel the upper runs of the belts 81 concurrently with and in the same direction as the contiguous runs of the belts 80, and hence the successive box blanks which are interposed between the contiguous runs of the belts are carried rearward thereby.

An endless conveyer, termed a "die conveyer," passes about two spaced-apart hexagonal wheels 99, 100, whereof the former is fast on the shaft 89 in the space between the pulleys 88, and the wheel 100 is fast on a shaft 101 having its bearings in a standard 102 on the bed. This conveyer is continuously driven in such a manner that its upper run travels continuously toward the rear of the machine, thereby rotating the wheel 99 and perforce the shaft 89 and the pulleys 88 thereon to effect the travel of the lower feeding belt 81 above mentioned. Such upper run of the conveyer is sustained and guided throughout its length on a plate 103. In the present instance this plate is supported adjacent its forward end by a cross-bar 104 bolted to two spaced-apart standards 105 on the bed, and is supported at its rearward end by the standard 102 above referred to. The plate is also supported intermediate its ends by a cross-bar 106 affixed to two spaced-apart standards 107 on the bed. (See Figs. 10, 11, 14 and 15.) The upper face of the plate 103 extends in a horizontal plane from its forward end to the cross-bar 106 and it then declines slightly to its rearward end, the upper run of the chain being guided accordingly for a purpose hereinafter explained.

The die conveyer, in its preferred form, comprises an endless chain of pivotally connected counterpart links 108 each of which is provided in one face with gear teeth 109 adapted to mesh with a gear wheel 110 fast on a cross shaft 111 having its bearings in boxes 112 in the standards 107. The outer face of each link is transversely recessed to afford a rectangular chamber having a flat bottom 113, spaced apart side walls 114 and an end wall 115, the opposite end of the chamber being open. The chamber corresponds in width and length with the body *a* of the blank so that if the blank be positioned above the chamber, as seen in Fig. 23, and then be pressed down into the chamber, as in Figs. 24 and 25, the body *a* of the blank will be seated flatwise in the chamber, and the side laps *b* and end lap *c* will be bent upward, the flap *d* extending freely beyond the open end of the chamber. At the respective ends of the side walls 114 are upstanding lugs 116, the function of which will presently appear.

Fast on that end of the shaft 111 remote from the die conveyer is a bevel gear wheel 117 in mesh with a similar wheel 118 on the adjacent end of a shaft 119 extending longitudinally of the bed. This shaft 119 has its bearings in suitably-disposed standards 120 on the bed and is equipped at its opposite end with a bevel gear wheel 121 in mesh with a similar wheel 122 on the drive shaft 38, as seen in Figs. 14 and 15. Thus continuous motion is transmitted to the gear wheel 110 and thence to the die conveyer with the teeth of which the gear wheel meshes, as above mentioned.

It is to be noted that the rearward portion of the upper belt 80 overlies the end extensions of the blanks at the forward portion of the die conveyer, and that the gearing is such that the speed of the belts 80, 81 is slightly higher than that of the conveyer. Hence the belts advance the blank into contact with the opposing uprising lugs 116 of the conveyer link as they approach the top of the wheel 99, and by the slippage of the belts hold the blank in that position until the link assumes a true horizontal position, whereupon the rearward portion of the upper belts 80 by their contact with the blank hold the latter in accurate position between the lugs at the four corners of the link. The blank thus disposed is carried by the die conveyer to a position where the blank is acted upon by one of a series of travelling former bars 123 and is forcibly depressed thereby into the chamber of the link. A sheet metal strip 124 (Figs. 10 and 14) is secured to a cross-bar 125 between the standards 86 so as to extend rearward and overhang the blank in a manner to serve as a guard therefor during its advancement.

The former bars 123 are borne by a continuously driven conveyer 126 termed a "former conveyer", which is guided through an extended course including a path laterally and longitudinally of the upper run of the die conveyer, as seen in Figs. 9, 10, 11 and 12. The former conveyer is supported and guided in its path adjacent the die conveyer by means including three suitably spaced wheels 127, 128, 129. The wheel 127, which in the present instance is a hexagonal pulley, is mounted on a cross shaft 130 journaled in bearings in the standards 105; the wheel 128, which is a gear wheel, is mounted on a shaft 131 journaled in boxes 132 in the upper portions of the standards 107, and the wheel 129, which is also a gear wheel, is mounted on a shaft 133 journaled in standards 134 rising from the rear of the bed. The intermediate and rear wheels 128, 129 are arranged to guide the former conveyer in a horizontal path and the front wheel is arranged to direct the conveyer in a slightly higher plane, and hence the conveyer declines from the wheel 127 to the wheel 128. In the travel of the former conveyer the lower run thereof moves from the front to the rear of the machine and is supported by a plate 135 which is bolted to brackets 136 secured to the standards 105, 134. The former conveyer is also supported and guided by wheels 137 which are mounted in a substantial frame structure 138 located above and beyond both ends of the bed 35. (See Fig. 9).

Fast on the shaft 131, which carries the gear wheel 128, is a gear wheel 142 in mesh with a gear wheel 143 fast on the shaft 111, which carries the wheel 110 in mesh with the gear teeth of the die conveyer. Also fast on the shaft 131 are two sprocket wheels 144, 145, the former of which is connected by means of a chain 146 with a sprocket wheel 147 on the shaft 133 which carries the gear wheel 129. The sprocket wheel 145 is connected by means of a chain 147' with a sprocket wheel 144' fast on the shaft 84 which carries the rearward pulleys 83 for the blank feeding belts 80, the upper run of the chain meshing with the teeth of a sprocket wheel 146' on the shaft 130.

By the gearing just described it will be seen that continuous motion is transmitted from the shaft 111 to the shaft 131 and its gear and sprocket wheels, and thence to the shafts 84, 130 and 133 and their appurtenances in a manner to impel the two conveyers, and also to effect the concurrent travel of the belts 80, 81 previously described.

The former conveyer preferably comprises an endless chain of pivotally connected counterpart links, each of which is provided in one face with gear teeth 139 which mesh with the wheels 128, 129. The outer face of each link is recessed to receive a rectangular former bar 123 which is secured in place by means, for example, of a screw 140. This bar projects at right angles from the link in such a manner as to overhang the former conveyer when such link is travelling adjacent the acting run of the die conveyer. The former bar corresponds in width and thickness with the interior of the box to be formed; and is adapted during the concurrent travel of the juxtaposed portions of the two conveyers to bear upon one of the blanks and press it into a chambered link of the die conveyer, that is to say, when a blank is positioned on and advanced by a link of the die conveyer as above mentioned, one of the former bars 123 is brought over the blank, and as the two conveyers progress such former bar is gradually lowered in a manner to bear upon the blank and force it down into the chamber of its supporting link and thus bend the two side laps $b$ and the end lap $c$ of the blank into upstanding position, as previously described. (See Fig. 24).

The upper face of each of the former bars 123 is provided at its forward or acting end with a longitudinal slot or recess 141 the function of which will presently appear.

During the progress of the conveyers, with the blanks seated in succeeding links of the die conveyer and engaged by the former bars of the former conveyer, as above described, the upstanding side laps $b$ and end lap $c$ of each blank are successively folded over upon the opposing recessed end of the engaged former bar in a manner to impart the requisite box form to the body of the blank. The preferred folding mechanism is as follows, reference being had to Figs. 11, 15, 19, 22, 26, 28 and 29. Secured to and between the standards 107, so as to overlie the active runs of the two conveyers, is a cross-bar 148 to the underside of which is bolted a plate 149 in position to overhang the upper run of the die conveyer. This plate is formed with a pair of folding members, one of which comprises a shoe 150 upwardly curved and positioned to lie in the path of the upstanding side laps $b$ of the blanks contained in the die conveyer, and the other of which members comprises an arm 151 forwardly, upwardly and outwardly inclined to lie in the path of the upstanding end laps $c$ of the contained blanks. As the adjacent runs of the two conveyers progress the upper portion of the leading side lap of each blank contained in the die conveyer and embracing a former bar impinges against the opposing up-curved shoe 150 and is thereby gradually folded over upon the top of the proximate former bar, as seen in Figs. 26 and 27. Coincidentally the spaced-apart peripheral cam projections 152 of a rotating folding wheel 153 engage the other upstanding side lap of the blank and fold it over upon the forming bar, and into position to pass under the folding shoe as the conveyers progress; whereupon the end lap $c$ of the blank impinges against the inclined inner edge of the folding arm 151 and is thereby folded over upon the two side laps and the proximate recessed end of the forming bar as shown. The folding wheel comprises a pair of spaced cam disks formed on the hub 154 of a gear wheel 155 loosely mounted on the shaft 131 so as to be rotatable independently of the latter. This gear wheel meshes with and is actuated by a gear wheel 156 fast on the positively driven shaft 111. The ratio of the gear wheels is such that the folding wheel is rotated at proper relative speed to the travel of the conveyers in order to ensure the timely operation of the cam projections 152 on the opposing end laps of the successive blanks contained in the die conveyer and engaged by the former bars. It is to be noted that the recess of each former bar is only partially covered by the folded end lap of the blank, for a purpose hereinafter mentioned.

Loosely supported by studs 157 on the folder plate 149 is the perforated end of a long bar 158 which extends longitudinally of the die conveyer and rests by gravity upon the succession of former bars during their travel in proximity to and some distance beyond the die conveyer. Immediately the side and end laps of the blank are folded as above described, the box thus formed upon a former bar is advanced beneath the bar 158 which, by its weight, holds the completed side and end folds of the blank in close contact with each other and in position upon the former bar to ensure the adhesion of the contiguous glued surfaces. (See Figs. 11 and 15).

When the folding operations have been completed by the respective folding members the travelling die conveyer, as it declines rearward, gradually disengages itself from the former bar of the former conveyer, thus leaving the box on the former bar as the latter progresses with the former conveyer.

The blanks contained in the hopper are delivered in succeeding order to the links of the die conveyer, and are then acted upon by the succession of former bars, and by the folding devices as above described.

As the boxes supported by the former bars approach the rearward end of the bed 35 the coating of friction or ignition material e is applied to the upper surfaces of the folded end laps of the respective boxes. The mechanism for this purpose is shown in Figs. 9, 11, 12, 13, 15 and 16. It includes a suitably-disposed rotating wheel 159 under and in contact with the periphery of which the end laps are carried. This wheel is mounted on a shaft 160 journaled in a suitable frame 161 having spaced guides 162 between and upon which a paint receptacle 163 is detachably supported. Mounted to rotate in the paint receptacle is a wheel 164 between the periphery of which and the periphery of the wheel 159 is interposed a transfer wheel 165. The shafts 166, 167 of the respective wheels 164, 165 are journaled in bearings in the frame 161 and are provided with intermeshing gear wheels 168, 169, with the latter of which meshes a gear wheel 170 on the shaft 160. Fast on this shaft 160 is a sprocket wheel 171 which is connected by means of a chain 172 with a sprocket wheel 173 on the driven shaft 131. Thus motion is transmitted from the latter shaft to the shaft 160 and thence through the gearing to the shafts 167, 166 and their wheels 165, 164, the paint being perforce transferred from the paint receptacle 163 to the periphery of the wheel 159 and thereby applied to the end laps of the successively progressing boxes carried by the former bars. A backer roll 174 for the folded ends of the boxes is mounted on a standard 175 directly beneath the paint-applying wheel 159; and a pair of pressure rolls 176 between which pass the folded end laps of the boxes on the former bars, are mounted on upwardly projecting studs on the standard 134, the latter rolls being located laterally of the path of the painted surfaces of the end laps. (See Figs. 11, 12, 13 and 21).

The former conveyer transports the boxes from the pressure rolls 176 to and through an extended generally tortuous course, which may include a drying chamber, until the painted surfaces of the boxes have become dry dry, whereupon the finished boxes are stripped from the former bars by suitable mechanism located at the head or front of the machine. This mechanism which is shown in Figs. 9, 30, 31 and 32 of the drawings, includes two spaced-apart gear wheels 177, 178 about which the former conveyer is guided in a horizontal path, with the recessed faces of the former bars upward. These gear wheels are mounted upon suitably-disposed uprights 179, of the supporting framework. The shaft 180 of the wheel 177 has its bearings in brackets 181 clamped to the adjacent uprights, and the shaft 182 of the wheel 178 has its bearings in boxes 183 which are supported for horizontal adjustment by set screws 184 in the open projections 185 of the brackets 186 clamped to the adjacent uprights. The run of the former conveyer between the wheels 177, 178 is supported by a horizontal bed 187 borne by brackets 188 on the uprights. Mounted to travel above and longitudinally of the bed 187 is an endless conveyer 189 termed an "unloading conveyer", the lower run whereof progresses directly above and concurrently with the projecting former bars of the former conveyer. The unloading conveyer preferably comprises an endless chain of hingedly connected counterpart links that are supported and guided by a pair of spaced-apart sprocket wheels 190, 191. The shaft 192 of the wheel 190 has its bearings in boxes 193 supported by brackets 194 clamped to a pair of horizontal bars 195 included in the general framework. The shaft 196 of the wheel 191 has its bearings in boxes 197 which are supported for vertical adjustment by set-screws 198 in the open projections 199 of brackets 200 clamped to the bars 195. Fast on the shafts 182 and 196 are sprocket wheels 201, 202, respectively, which are operatively connected by chains 203, 204 with corresponding sprocket wheels 205 (one of which is indicated in Fig. 9), on an upper transverse shaft 206 having its bearings in boxes supported by the general framework. On the transverse shaft 206 is a bevel wheel 207 which meshes with a similar wheel 208 on the forward end of a line shaft 209 having its bearings in suitable boxes also supported by the framework. This line shaft is equipped with a sprocket wheel 210 which is operatively connected by means of a chain 211 with a sprocket wheel 212 on the driven shaft 119 (Fig. 14) hereinbefore referred to. By the system of gearing above described it will be seen that continuous motion is transmitted from the shaft 119 to the shafts 182, 196 of the gear and sprocket wheels 178, 191, respectively, thereby actuating the former and unloading conveyers to impel their adjacent runs concurrently and in the same direction.

Each of the links of the unloading conveyer 189 is formed with a transverse guide way in which is slidably fitted a stripper bar 213 which extends beyond both sides of the link and has adjacent its ends lateral studs 214, 215, respectively. The two studs extend in opposite directions and are so located that the stud 214 projects upward and the stud 215 depends from the bar during its traverse with the lower run of the unloading conveyer. Reciprocation of the bar 213 during the travel of the unloading conveyer is effected by the engagement of the stud 214 with a V-cam groove 216 formed in a block 217 bolted to the bed 187.

The relative arrangement of the several stripper bars on the unloading conveyer is such that as each bar approaches the underlying former bar 123 of the former conveyer, the stud 215 of such stripper bar enters the adjacent recess 141 of the former bar just back of the end lap of the box carried by such former bar, and as the two conveyers progress the stud 214 of the stripper bar enters into and moves along the cam groove. This groove at once acts to force the stripper bar outward in such a manner that the stud 215 thereof impinges against the opposing end lap (c) of the box and strips the box bodily from the former bar, whereupon the stripper bar is positively retracted by the receding leg of the cam groove. Immediately upon the separation of the box from the former bar the box is forced into an underlying chute 218 extending from an opening 219 formed in the bed 187. The preferred means for thus depressing the box comprises a presser arm 220 which is pivoted at one end to a bracket 221 on the cam block 217, and is arranged to overhang the active run of the unloading conveyer. The free end of the arm is turned downward, as at 222, and is provided with a foot 223 which overlies the underlying freed box. The arm is held normally in down position by means of a spring 224, which, encircling a stem 225 rising from the block 217, bears against the arm and a nut 226 on said stem. On the underside of the arm is formed an inclined cam shoe 227 under which move the up-projecting pivot lugs of the successive links of the former conveyer chain, such lugs, in conjunction with the spring 224, thus effecting the vertical vibration of the arm as each stripper bar is projected by the action thereon of the cam. Hence the foot of the presser arm acts upon and forces down each succeeding box when it is stripped from the recessed end of a former bar.

The former conveyer with its empty former bars progresses from the unloading station to the blank feeding and folding locations preparatory to a repetition of the various performances. The cycle of travel of the former conveyer is clearly indicated in Fig. 9.

The general operation of the machine above described may be summarized as follows:

Printed and scored box blanks are stacked in the hopper and power is then applied to the drive shaft 38. Each succeeding lowermost blank of the stack is ejected from the hopper by the reciprocating slide and engaged with the feed rolls, which rolls thereupon move the blank to and across the effective path of the glue wheel 78. Glue is thus applied to the side laps of the progressing blank, and at the same time the blank is engaged and carried rearward by the belts 80, 81. Since these belts are moving at a slightly higher speed than the die conveyer 115, the blank is brought into contact with the opposing lugs 116 of one of the up-rising links at the forward end of that conveyer, and is so held by the slippage of the belts until the conveyer link assumes a true horizontal position. Thereupon the overhanging portions of the upper belts 80 hold the blank in accurate position between the opposing lugs at the four corners of the conveyer link. While the blank is in this position it is advanced to the junction of the die and former conveyers. Here a former bar of the latter is positioned to overhang the blank, and as the two conveyers concurrently progress in converging paths their adjacent runs are gradually brought together in such a manner that such former bar presses the underlying blank down into the link of the die conveyer and perforce folds the two side laps and the end lap in up-standing positions, as shown in Fig. 24. In the further progress of the conveyers the upper portion of the leading side lap of the blank impinges against the opposing surface of the shoe 150 and is thereby folded over upon the former bar, and at the same time the cam projections of the rotating wheel 153 bear against the other side lap of the blank and fold it over upon the former bar, whereupon the latter fold also passes to and under the shoe 150 and is thereby securely held down. Immediately thereafter the up-turned end lap of the box blank contacts with the inclined folding arm 151 and is thereby folded over upon the portions of the two side laps which were previously supplied with glue, passing thence under the presser bar 158 which effectively holds the completed folds in down position for a relatively long interval of time. Upon the completion of the folding operations just mentioned the die conveyer, as it declines, gradually disengages itself from the former bar, thus leaving the formed box uniformly supported on the former bar. This bar carries the box underneath the paint wheel 159 and the latter applies a coat of friction paint to the opposing surface of the folded end lap of the box, whereupon the former bar with the box thereon passes between the rolls 176 which impart the final pressure to the folds. At this stage the glue is well set. Thence the box, still engaged with and uniformly supported by the former bar, is transported through the extended drying path leading to the head or front of the conveyer and moves in parallelism therewith. At this juncture a pusher stud 215 on one of the stripper bars 213 of the unloading conveyer enters the recessed or slotted portion of the former bar, just back of the folded end lap of the box, and as the juxtaposed portions of the conveyers progress the said stripper bar and its stud 215 are advanced by the action of the cam 216 in a manner to push the box off the outer end of the bar; whereupon the freed box is forced down the chute 218 by the overhanging vibratory arm 220 which is periodically actuated by a hinged portion of the unloading conveyer in opposition to the action of the pressure spring 224 on the arm.

It is to be understood that our invention is not limited to the particular mechanisms herein disclosed to exemplify the invention, as such mechanisms may be variously modified within the principle of the invention and the scope of the appended claims.

We claim—

1. The combination with means for successively feeding box blanks, of a die conveyer comprising an endless chain of chambered links having a run extending from and travelling in the same direction as the blanks, each of said links being constructed to receive and support a blank delivered thereto by the feeding means, a former conveyer comprising an endless chain of links having a run mounted to travel adjacent to and in the same direction as the said run of the die conveyer, and having also former bars arranged in co-operative relation to the chambers of the die conveyer, and means for concurrently impelling the said runs of the two conveyers in such a manner that the former bars progressively enter the said chambers and force the succeeding blanks thereinto in partially folded condition.

2. The combination with means for successively feeding box blanks, of a die conveyer comprising an endless chain of chambered links having a run extending from and travelling in the same direction as the blanks, each of said links being constructed to receive and support a blank delivered thereto by the feeding means, a former conveyer comprising an endless chain of links having a run mounted to travel adjacent to and in the same direction as the said run of the die conveyer, and having also former bars arranged in co-operative relation to the chambers of the die conveyer, means for concurrently impelling the said runs of the two conveyers in such a manner that the former bars progressively enter the said chambers and force the succeeding blanks thereinto in partially folded condition, and means for completing the folding of the blanks while they are supported by the former bars in the respective chambers.

3. The combination with means for successively feeding box blanks, of a die conveyer comprising an endless chain of chambered links having a run extending from and travelling in the same direction as the blanks, each of said links being constructed to receive and support a blank delivered thereto by the feeding means, a former conveyer comprisng an endless chain of links having a run mounted to travel adjacent to and in the same direction as the said run of the die conveyer, and having also former bars arranged in co-operative relation to the chambers of the die conveyer, means for concurrently impelling the said runs of the two conveyers in such a manner that the former bars progressively enter the said chambers and force the succeeding blanks thereinto in partially folded condition, means for completing the folding of the blanks while they are supported by the former bars in the respective chambers, and means for applying ignition material to an exposed side of each succeeding box while it is supported by a former bar.

4. The combination with means for successively feeding box blanks, of a die conveyer comprising an endless chain of chambered links having a run extending from and travelling in the same direction as the blanks, each of said links being constructed to receive and support a blank delivered thereto by the feeding means, a former conveyer comprising an endless chain of links having a run mounted to travel adjacent to and in the same direction as the said run of the die conveyer, and having also former bars arranged in co-operative relation to the chambers of the die conveyer, means for concurrently impelling the said runs of the two conveyers in such a manner that the former bars progressively enter the said chambers and force the succeeding blanks thereinto in partially folded condition, means for completing the folding of the blanks while they are supported by the former bars in the respective chambers, means for applying ignition material to an exposed side of each succeeding box while it is supported by a former bar, means for guiding the former conveyer together with its former bars and the boxes thereon, through an extended drying path, and means for thereafter stripping the boxes from the former bars.

5. The combination with means for successively feeding box blanks, and means for applying adhesive substance to the said blanks during their traverse, of a die conveyer comprising an endless chain of chambered links having a run extending from and travelling in the same direction as the blank feeding means, each of said links being constructed to receive and support a blank delivered thereto by the said feeding means, a former conveyer comprising an endless chain of links having a run mounted to travel adjacent to and in the same direction as the said run of the die conveyer, and having also projecting former bars arranged in co-operative relation to the chambers of the die conveyer, means for concurrently impelling the two conveyers in such a manner that the former bars progressively enter the said chambers and force the succeeding blanks thereinto in partially folded condition, means for completing the folding of the blanks while they are supported by the former bars in the respective chambers, and a presser bar overhanging the path of the progressing former bars beyond the folding means and bearing upon the folded portions of the boxes carried by said bars.

6. The combination with means for successively feeding box blanks, of a conveyer comprising an endless chain of chambered links having a run extending from and travelling in the same direction as the blanks, and means for impelling said conveyer to present its links successively to the path of the progressing blanks, each of said links having guide projections which initially enter the path of the approaching blank and serve as an abutment to position the blank above the chamber of the link.

7. The combination with means for successively feeding box blanks, each comprising a body portion having side and end extensions, of an endless conveyer having a succession of die chambers therein and also having up-standing lugs at the respective corners of each chamber, and means for impelling said conveyer to present its chambers successively to the path of the advancing blanks in such a manner that the end extensions will abut against the opposing end lugs of an approaching die chamber and the blank be positioned with the end extensions between the respective pairs of lugs, the side extensions seated on the walls of the chamber, and the body portion overhanging the chamber.

8. The combination with means for successively feeding box blanks, each comprising a body portion having side and end extensions, of an endless conveyer having a succession of die chambers therein and also having up-standing lugs at the respective corners of each chamber, means for impelling said conveyer to present its chamber successively to the path of the advancing blanks in such a manner that the end extensions will abut against the opposing end lugs of an approaching die chamber and the blank be positioned with the end extensions between the respective pairs of lugs, the side extensions seated on the walls of the chamber, and the body portion overhanging said chamber, and mechanism, including a former bar, for acting upon the body of each blank positioned above a die chamber and thereby pressing said body into the chamber and bending upward the side extensions and one of the end extensions.

9. The combination with means for successively feeding box blanks, each comprising a body portion having side and end extensions, of an endless conveyer having a succession of die chambers therein and also having up-standing lugs at the respective corners of each chamber, means for impelling said conveyer to present its chambers successively to the path of the advancing blanks in such a manner that the end extensions will abut against the opposing end lugs of an approaching die chamber and the blank be positioned with the end extensions between the respective pairs of lugs, the side extensions seated on the walls of the chamber and the body portion overhanging said chamber, mechanism, including a former bar, for acting upon the body of each blank positioned above a die chamber and thereby pressing said body into the chamber and bending upward the side extensions and one of the end extensions, and means for folding the upper portions of said side extensions over upon the former bar.

10. The combination with means for successively feeding box blanks, each comprising a body portion having side and end extensions, of an endless conveyer having a succession of die chambers therein and also having up-standing lugs at the respective corners of each chamber, means for impelling said conveyer to present its chambers successively to the path of the advancing blanks in such a manner that the end extensions will abut against the opposing end lugs of an approaching die chamber and the blank be positioned with the end extensions between the respective pairs of lugs, the side extensions seated on the walls of the chamber and the body portion overhanging said chamber, mechanism, including a former bar, for acting upon the body of each blank positioned above a die chamber and thereby pressing said body into the chamber and bending upward the side extensions and one of the end extensions, and means for folding the upper portions of said side extensions over upon the former bar, said last-named means comprising a stationary shoe and a rotary folding member overhanging the path of the said conveyer.

11. The combination with means for successively feeding box blanks, each comprising a body portion having side and end extensions, of an endless conveyer having a succession of die chambers therein and also having up-standing lugs at the respective corners of each chamber, means for impelling said conveyer to present its chambers successively to the path of the advancing blanks in such a manner that the end extensions will abut against the opposing end lugs of an approaching die chamber and the blank be positioned with the end extensions between the respective pairs of lugs, the side extensions seated on the walls of the chamber and the body portion overhanging said chamber, mechanism, including a former bar, for acting upon the body of each blank positioned above a die chamber and thereby pressing said body into the chamber and bending upward the side extensions and one of the end extensions, and devices for folding the upper portions of said side extensions over upon the former bar and for folding the upper portion of the said end extension over upon the folded side extensions and the former bar.

12. The combination with upper and lower blank-feeding belts having co-operating parallel runs between which box blanks are held flatwise, and means for concertedly impelling said belts, of an endless conveyer having a succession of die chambers therein to which the blanks are advanced by the said belts, each chamber having up-standing guide lugs, and means for impelling said conveyer to present its chambers successively to the path of the advancing blanks between the feeding belts, whereby each blank contacts with the opposing guide lugs of a die chamber and is accurately positioned above the said chamber.

13. The combination with upper and lower blank-feeding belts having co-operating parallel runs between which blanks are held flatwise, of an endless conveyer having a succession of die chambers therein mounted to travel between the rearward portions of the upper belts, each chamber having upstanding guide lugs, and means for impelling said conveyer to present its chambers successively to the path of the advancing blanks between the feeding belts, whereby each blank contacts with the opposing guide lugs of a die chamber and is accurately positioned above the said chamber.

14. The combination with means for feeding a succession of box blanks, of two conveyers having juxtaposed runs, one of said conveyers comprising a succession of die chambers upon which the blanks are delivered by the feeding means, and the other of said conveyers including a series of former members complementary to said chambers, means for concertedly impelling the said runs of the two conveyers to effect the gradual entry of the former members into the chambers above which the blanks are disposed, and then to effect the gradual separation of said members from the respective chambers, and means for folding the blanks upon the respective former members before the separation of the said members from the die chambers.

15. The combination with means for feeding a succession of box blanks, of two conveyers having juxtaposed runs, one of said conveyers comprising a succession of die chambers upon which the blanks are delivered by the feeding means, and the other of said conveyers including a series of former members complementary to said chambers, means for concertedly impelling the said runs of the two conveyers to effect the gradual entry of the former members into the chambers above which the blanks are disposed, and then to effect the gradual separation of said members from the respective chambers, means for folding the blanks upon the respective former members before the separation of the said members from the die chambers, and means whereby the boxes thus formed are stripped from the ends of the former members.

16. The combination with means for feeding a succession of box blanks, of an endless die conveyer having a succession of chambers and including an active run upon the chambers of which the blanks are delivered, an endless former conveyer having a run mounted to travel adjacent to the active run of the die conveyer, former bars extending from said former conveyer, means whereby the two conveyers are concertedly driven and the juxtaposed runs thereof directed in converging and then in diverging paths, whereby the said former bars are caused to approach and enter the die chambers in a manner to force the blanks into and partially fold them in the chambers, and whereby the said bars are thereafter separated from the chambers, and mechanism arranged to complete the folding of the blanks to box-form upon the successive former bars preparatory to the separation of said bars from the die chambers, whereby the thus formed boxes are supported by the former bars and carried from and beyond the die conveyer.

17. The combination with means for feeding a succession of box blanks, of an endless die conveyer having a succession of chambers and including an active run upon the chambers of which the blanks are delivered, an endless former conveyer having a run mounted to travel adjacent to the active run of the die conveyer, former bars extending from said former conveyer, means whereby the two conveyers are concurrently driven and the juxtaposed runs thereof are directed in converging and then in diverging paths, whereby the said former bars are caused to approach and enter the die chambers in a manner to force the blanks into and partially fold them in the chambers, and whereby the said bars are thereafter separated from the chambers, mechanism arranged to complete the folding of the blanks to box-form upon the successive former bars preparatory to the separation of said bars from the die chambers, whereby the thus formed boxes are supported by the former bars and carried from and beyond the die conveyer, and means whereby the boxes are stripped from the former bars.

18. The combination with means for feeding a succession of box blanks, of an endless die conveyer having a succession of chambers and including an active run upon the chambers of which the blanks are delivered, an endless former conveyer having a run mounted to travel adjacent to the active run of the die conveyer, means whereby the two conveyers are concurrently driven and the juxtaposed runs thereof directed in converging and then in diverging paths, whereby the said former bars are caused to approach and enter the die chambers in a manner to force the blanks into and partially fold them in the chambers, and whereby the said bars are thereafter separated from the chambers, mechanism arranged to complete the folding of the blanks to box-form upon the successive former bars preparatory to the separation of said bars from the die chambers, whereby the thus formed boxes are supported by the former bars and carried from and beyond the die conveyer, means for applying ignition paint to the succeeding boxes on the former bars, means for guiding the former conveyer through an extended drying path when it leaves the paint applying means, and means for stripping the boxes from the former bars.

19. The combination with a hopper for box blanks, and means for successively removing the blanks from the hopper, of feed rolls mounted to receive and advance the succeeding blanks, and including co-acting rearward upper and lower rolls, a wheel mounted to rotate immediately below said upper roll and operative to apply adhesive to each succeeding blank, said upper roll serving as a backer for the blank during the application of the adhesive, upper and lower blank feeding belts having co-operating parallel runs between which the blanks are delivered in proximity to the said upper and lower rolls, and mechanism for concertedly actuating the said feed rolls, wheel and belts.

20. The combination with a hopper for box blanks, and means for successively removing the blanks from the hopper, of feed rolls mounted to receive and advance the succeeding blanks, means in proximity to the rolls for applying adhesive to each succeeding blank, upper and lower blank feeding belts having co-operative parallel runs between which the blanks are delivered in proximity to the feed rolls, mechanism for concertedly actuating the said feed rolls and belts, two conveyers having juxtaposed runs, one of said conveyers comprising a succession of die chambers upon which the blanks are delivered by the feeding belts, and the other of said conveyers including a series of former members complementary to said chambers, means for concertedly impelling the said runs of the two conveyers to effect the gradual entry of the former members into the chambers above which the blanks are disposed, and then to effect the gradual separation of said members from the respective chambers, and means for folding the blanks upon the respective former members before the separation of the said members from the die chambers.

21. The combination with a hopper for box blanks, and means for successively removing the blanks from the hopper, of feed rolls mounted to receive and advance the succeeding blanks, means in proximity to the rolls for applying adhesive to each succeeding blank, upper and lower blank feeding belts having co-operative parallel runs between which the blanks are delivered in proximity to the feed rolls, mechanism for concertedly actuating the said feed rolls and belts, two conveyers having juxtaposed runs, one of said conveyers comprising a succession of die chambers upon which the blanks are delivered by the feeding belts, and the other of said conveyers including a series of former members complementary to said chambers, means for concertedly impelling the said runs of the two conveyers to effect the gradual entry of the former members into the chambers above which the blanks are disposed, and then to effect the gradual separation of said members from the respective chambers, means for folding the blanks upon the respective former members before the separation of the said members from the die chambers, and a presser bar overhanging the path of the progressing former members beyond the folding means and bearing upon the folded portions of the boxes carried by said members.

22. The combination with a conveyer having a succession of die chambers, a conveyer having a succession of former bars complementary to said chambers, and means for concurrently actuating said conveyers in such a manner that a former bar enters each succeeding chamber and forces a blank thereinto, thereby bending the sides and one end of the blank into up-standing position, of stationary folding members arranged to engage and fold the up-standing side and end portions of each succeeding blank, a rotary folder arranged to engage and fold one of the side portions before its passage to the stationary folding member, and means for actuating the rotary folder.

23. The combination with a conveyer having a succession of die chambers, a conveyer having a succession of former bars complementary to said chambers, and means for concurrently actuating said conveyers in such a manner that a former bar enters each succeeding chamber and forces a blank thereinto, thereby bending the sides and one end of the blank into up-standing position, of a stationary folding element comprising a shoe positioned to engage and fold successively the up-standing side portions of each succeeding blank, and an inclined arm positioned to engage and fold the up-standing end portion of the blank, a rotary element having peripheral cam portions for engaging and folding one of the upstanding side portions before the passage of the latter to the stationary shoe, and means for actuating said rotary element.

24. The combination with a travelling former conveyer having recessed former bars upon which boxes are supported, of an unloading conveyer mounted to travel adjacent to a horizontal run of the former conveyer, means for concurrently impelling the two conveyers, stripper bars carried by said unloading conveyer and having members adapted to enter into and recede from the recesses of the former bars, and means for reciprocating said stripper bars during their travel in proximity to the former bars, whereby the boxes are stripped from the succeeding former bars.

25. The combination with a travelling former conveyer having recessed former bars upon which boxes are supported, of an unloading conveyer mounted to travel adjacent to a horizontal run of the former conveyer, means for concurrently impelling the two conveyers, stripper bars carried by said unloading conveyer and having members adapted to enter into and recede from the recesses of the former bars, means for reciprocating said stripper bars during their travel in proximity to the former bars, whereby the boxes are stripped from the succeeding bars, and means for depressing the freed boxes.

26. The combination with a travelling former conveyer having recessed former bars upon which boxes are supported, of an unloading conveyer mounted to travel adjacent to a horizontal run of the former conveyer, means for concurrently impelling the two conveyers, stripper bars carried by said unloading conveyer and having members adapted to enter into and recede from the recesses of the former bars, means for reciprocating said stripper bars during their travel in proximity to the former bars, and means for depressing the freed boxes, said depressing means comprising a vibrating bar overhanging the active run of the unloading conveyer and having a portion which is successively engaged by the pivotal connections of the conveyer links.

Signed at Barberton in the county of Summit and State of Ohio this 12 day of December A. D. 1922.

JACOB P. WRIGHT.
CHARLES F. WRIGHT.